Nov. 25, 1952  G. KLIEGEL  2,618,943
CUP, SAUCER, AND CREAM JUG COMBINATION
Filed Jan. 31, 1952
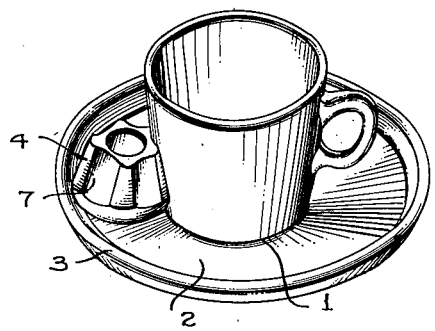
FIG-1
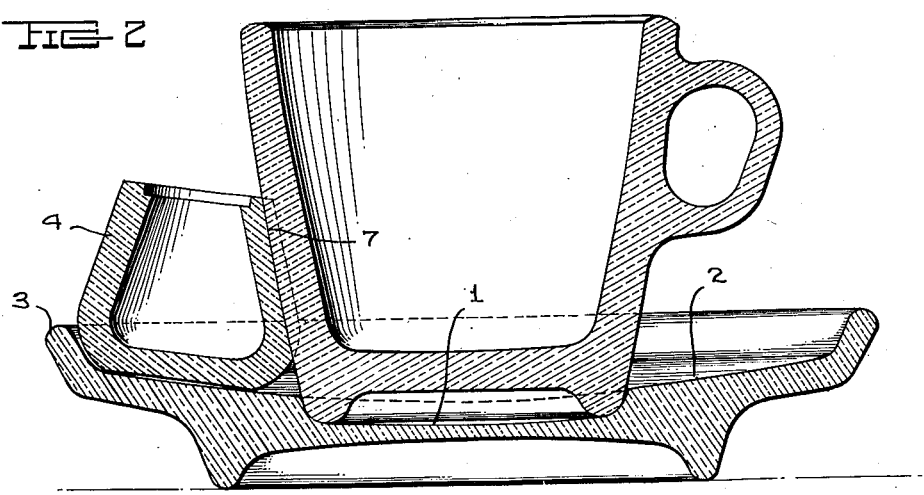
FIG-2
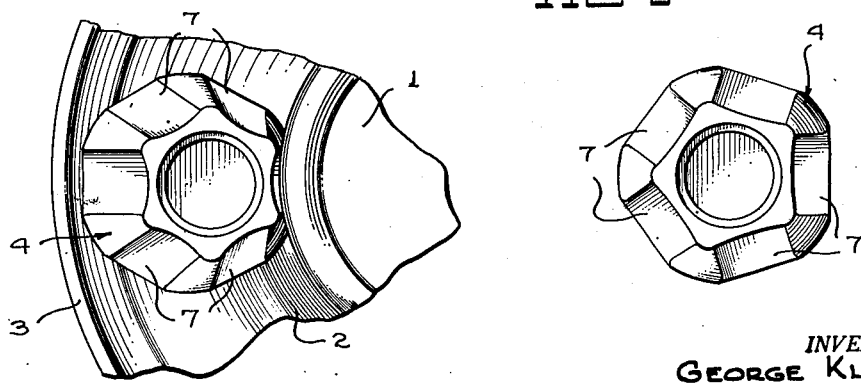
FIG-3
FIG-4
*INVENTOR.*
GEORGE KLIEGEL
*George Kliegel*

Patented Nov. 25, 1952

2,618,943

UNITED STATES PATENT OFFICE 2,618,943

CUP, SAUCER, AND CREAM JUG COMBINATION

George Kliegel, Washington, D. C.

Application January 31, 1952, Serial No. 269,296

2 Claims. (Cl. 65—13)

The object of the present invention is to provide for conveniently assembling a small cream jug on a saucer having a cup thereon and to prevent the falling of the cream jug from the saucer.

The present invention consists of a saucer having an upper surface of a spherical concavity in the portion extending from the center depression, the edge of the saucer is provided with a rim; a cream jug having five-sided, six-sided or more side faces of the same contour conforming to the sidewall of the cup; any one of these side faces of the cream jug may be positioned against the sidewall of the cup, the cream jug resting on the spherical concavity of the saucer and leans against the sidewall of the cup, as shown in the drawings and particularly pointed out in the appended claims.

In the drawings:

Figure 1 is a perspective.

Figure 2 is a cross sectional view.

Figure 3 and Figure 4 are plan views showing the pluralities of the side faces of the cream jug.

In carrying out the invention the saucer in Figure 2 shows a depression 1 in which the bottom of the cup is seated, the upper surface of the saucer outwardly from the depression 1 has a spherical concavity 2 on which the cream jug 4 rests, the edge of the saucer has a rim 3 to prevent the falling of the cream jug from the saucer.

As shown, the rim on the saucer extends upwardly at an angle corresponding to the inclination of the sidewall of the cream jug towards the bottom with respect to the base thereof. The spherical surface, as shown, is constructed on a radius several times the overall diameter of the saucer, so that the annular portion of the saucer surrounding the cup well, will provide a 3-point support for a cream jug. The slight spherical curvature of the saucer prevents adherence of liquid to the base of the cream jug.

The plan view in Figure 3 shows the five-sided top and the concave side faces 7 of the cream jug.

The plan view in Figure 4 shows the six-sided top and the concave side faces 7 of the cream jug.

Any one of the side faces of the cream jug having different pluralities of the same contour conforming side faces will lean against the sidewall of the cup.

What I claim is:

1. A cup and a saucer and a cream jug, said saucer having a center depression, which holds the cup, and an upper surface of spherical concavity around said center depression and an angular upwardly extending peripheral rim at the edge of the saucer, said rim on the edge of the saucer defining a space around the cup, the mean width of said space approximating the maximum width of the cream jug so that said rim on the edge of the saucer may coact with the cup for holding the cream jug in position on the saucer between said rim and the cup, when said cup is seated in said depression.

2. The combination as claimed in claim 1 in which the cream jug has five, six or more side faces of the same contour, conforming to the sidewall of a cup, the cream jug resting on the spherical concavity of the saucer and leaning with any one of the conforming side faces against the sidewall of the cup.

GEORGE KLIEGEL.

REFERENCES CITED

The following references are of record in the file of this patent:

UNITED STATES PATENTS

| Number | Name | Date |
|---|---|---|
| D. 12,422 | Brundige | Aug. 16, 1881 |
| D. 37,408 | Straus | Apr. 18, 1905 |
| D. 50,194 | Haley | Jan. 16, 1917 |
| D. 99,626 | Leppke | May 12, 1936 |
| D. 137,118 | Kleinberg | Jan. 25, 1944 |
| 508,176 | Leggett | Nov. 7, 1893 |
| 2,075,657 | Powers et al. | Mar. 30, 1937 |
| 2,348,028 | Rasch | May 2, 1944 |
| 2,492,892 | Schlumbohm | Dec. 27, 1949 |
| 2,583,951 | Kliegel | Jan. 29, 1952 |

FOREIGN PATENTS

| Number | Country | Date |
|---|---|---|
| 20,948 | Great Britain | Oct. 19, 1901 |